United States Patent [19]
Schick

[11] Patent Number: 5,608,564
[45] Date of Patent: Mar. 4, 1997

[54] SCANNING OBJECTIVE

[75] Inventor: Anton Schick, Schwindegg, Germany

[73] Assignee: Siemens Aktiengesellschaft, Munich, Germany

[21] Appl. No.: 343,513

[22] PCT Filed: Nov. 3, 1992

[86] PCT No.: PCT/EP92/02521

§ 371 Date: Nov. 23, 1994

§ 102(e) Date: Nov. 23, 1994

[87] PCT Pub. No.: WO93/24854

PCT Pub. Date: Dec. 9, 1993

[30] Foreign Application Priority Data

May 25, 1992 [DE] Germany .............. 42 17 298.5

[51] Int. Cl.$^6$ .................... G02B 26/08
[52] U.S. Cl. ............ 359/205; 359/206; 359/662; 359/792
[58] Field of Search .............. 359/205, 206, 359/662, 663, 792, 434, 362; 347/241, 244, 258–260

[56] References Cited

U.S. PATENT DOCUMENTS

| | | | |
|---|---|---|---|
| 4,734,578 | 3/1988 | Horikawa | 250/234 |
| 4,893,008 | 1/1990 | Horikawa | 250/234 |
| 4,953,927 | 9/1990 | Vedder . | |

FOREIGN PATENT DOCUMENTS

| | | | |
|---|---|---|---|
| 0168643A3 | 1/1986 | European Pat. Off. | G01N 21/88 |
| 3610165A1 | 10/1986 | Germany | G02B 21/00 |
| 4-97211 | 3/1992 | Japan | G02B 13/00 |

OTHER PUBLICATIONS

Applied Optics and Optical Engineering, vol. X, Copyright 1987, W. B. Wetherell, "Use of Afocal Lenses in Scanning Systems", pp. 174 and 175.

*Primary Examiner*—James Phan
*Attorney, Agent, or Firm*—Hill, Steadman & Simpson

[57] ABSTRACT

A high resolution with at the same time high testing speed is required of scanning objectives for the linewise or pointwise three-dimensional scanning of object surfaces. In order to be able to image as many image points as possible with high resolution, the scanning objective must exhibit a correspondingly large numerical aperture with, at the same time, a large image field. For this purpose, it is constructed of three lens groups (1; 2; 3). The first and second lens groups (1; 2) effect both a scan angle reduction and a pupil enlargement. The entrance pupil (61) is imaged into the entrance pupil (63) of the third lens group (3). The third lens group (3) has a large numerical aperture of, for example, 0.6. Furthermore, the real intermediate image (5) is imaged by the second lens group (2) with positive refractive power and greater focal length (f) than the first lens group (1), at infinity. With a beam diameter (D) at the entrance of the scanning objective of 7.5 mm, a scan angle (θ) of +/−16° and a scan length S of 3.5 mm, it is possible to achieve, for example, a working spacing of 5 mm.

4 Claims, 2 Drawing Sheets

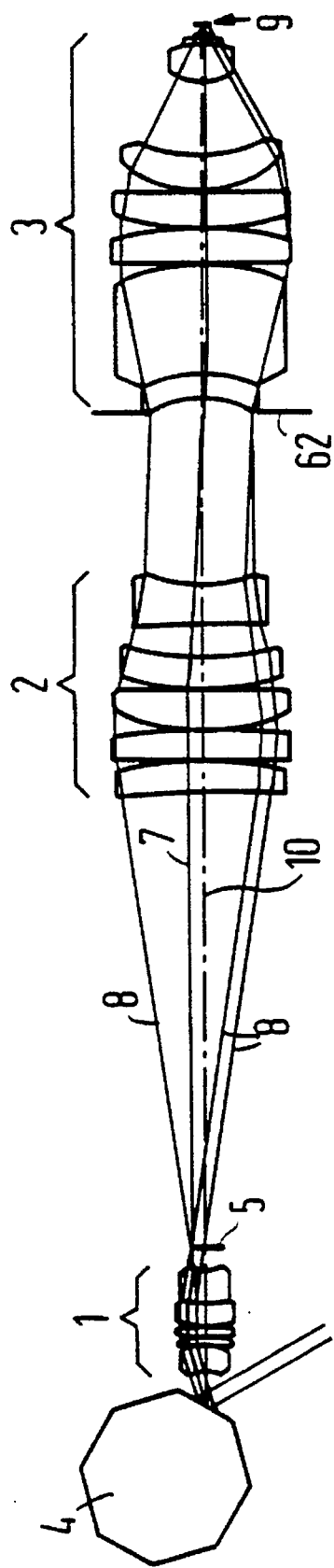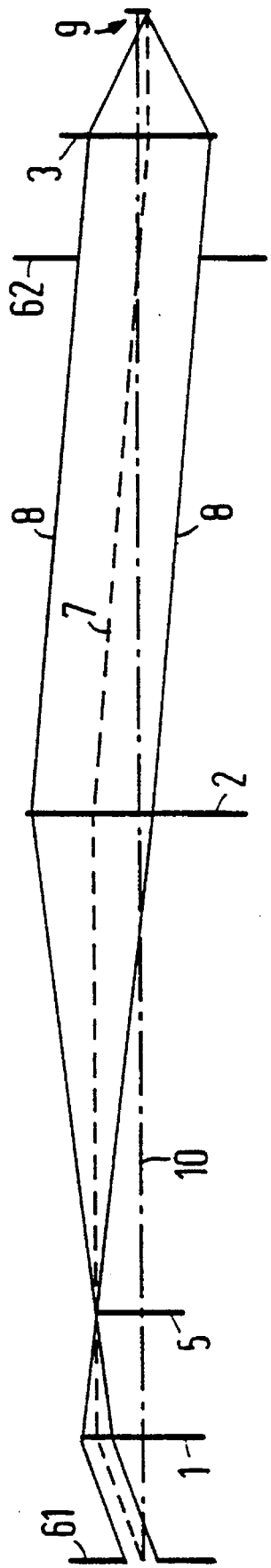

SCANNING OBJECTIVE

The invention relates to a scanning objective for the linewise or pointwise three-dimensional scanning of object surfaces with high resolution and high testing speed.

The increasing packing density on an electronic assembly requires a correspondingly adapted testing. As a rule, this testing takes place by means of a high-resolution optical inspection system. In principle, the triangulation principle can be used in conjunction with a system for the rapid scanning of a surface. However, as a rule in the case of reflecting surfaces of structured objects, the confocal principle is more suitable. In this case, a point light source which is usually defined by an aperture diaphragm, is imaged onto the object surface and the back-scattered light is imaged onto what is almost a point detector. In this connection, reference is made by way of example to the European patent application bearing the official file reference 91 120 863.5. The depth of field of a confocal optical configuration is a measure of the height resolution of the system. In this case, the depth of field is inversely proportional to the square of the numerical aperture. A scanning objective having a high numerical aperture and a very rapid beam deflection unit, for example a polygonal mirror rotating at a high speed of rotation, satisfies the requirements with respect to high resolution for an automatic testing system. At the present time, however, a scanning objective having a sufficiently high numerical aperture is not available. A sufficiently high numerical aperture should exhibit at least a value of 0.15.

The quantity which is essential in the design of a diffraction-limited scanning objective, and which reproduces the theoretically attainable imaging performance, is the Lagrange invariant L. This is formed by the product of half the beam diameter D at the location of a beam deflection unit and the scanning angle or, respectively, deflection angle $\theta$. This is synonymous with the product of numerical aperture NA and half the scan length S of the scanning objective.

$$L = \tfrac{1}{2} D \cdot \theta = \tfrac{1}{2} S \cdot NA$$

Since the resolving power is predetermined by the numerical aperture, L is proportional to the number of scanned points per scan line. A high scan rate is thus achieved by a high speed of deflection in the course of scanning and the greatest possible Lagrange invariant L of the scanning system. In accordance with the abovementioned dependencies, both beam deflection unit and scanning objective must be adapted to one another.

With respect to the beam deflection unit, it results that for rotating polygonal mirrors as compared with other beam deflectors, the feasible angular velocity, with at the same time a large beam diameter, is very high and thus the pixel data rate, is very high. Other beam deflectors are understood to include, for example, acousto-optic deflectors, resonance scanners or galvanometer mirrors. A limitation of the data rate in an upward direction is provided by the increasing moment of rotational inertia with increasing beam cross-section or increasing mirror facet diameter of the mirror. Depending upon the material used and the mechanical construction of the polygonal mirror, the result is accordingly an optimal dimensioning of the polygonal mirror.

The fundamental design of a scanning objective must take into account the following dependencies:

The greater the Lagrange invariant (high resolution with large image field), the more difficult it is to minimize geometric imaging defects and to design a scanning objective in production-oriented fashion.

In the event of an intensification of the requirements on the resolution, which is synonymous with an enlargement of the numerical aperture, the scan length is reduced with an unchanged Lagrange invariant.

If, for a system with a predetermined Lagrange invariant, the numerical aperture is increased with constant focal length, then the beam diameter increases with a reduction of the scan angle. An increase in the beam diameter at a small scan angle does, however, increase the number and the size of the facets of the polygonal mirror, whereby again the attainable speed of rotation is reduced.

If, for a system with a predetermined Lagrange invariant, the numerical aperture is increased while maintaining the scan angle, then the objective focal length is reduced. This means that in the case of conventional scanning objectives, the front and rear focal planes pass very close to the lens mount, since otherwise the correction of the aberrations is made considerably more difficult. This again limits the required space for the positioning of polygonal mirrors.

The interrelationships which have been enumerated illustrate that a scanning objective having a large numerical aperture and at the same time a large image field cannot be constructed using conventional means.

Scanning objectives which are currently available on the market exhibit numerical apertures of approximately 0.1 and have a scan angle of approximately 13° to 25° at focal lengths of at least 20 mm. These objectives can be adapted very well to polygonal mirrors rotating at high speed. In this case, the Lagrange invariant is approximately 1 mm. Objectives of this type of construction are, however, not suitable for confocal scanners with high resolution.

Furthermore, confocal laser scanning microscopes exist. In most cases, these are constructed on the basis of conventional optical microscopes or optical microscope objectives, and thus can also possess a high numerical aperture. With a Lagrange invariant of approximately 0.15 mm, however, the overall imaging performance is relatively low, on account of the small image field or, respectively, of the small scan length. In this case, acousto-optic beam deflectors are frequently used, whereby the imaging performance is reduced on account of the small deflection angle and the simultaneously occurring small aperture, which is not circular. Moreover, the beam deflection is not free from aberration (astigmatism).

German laid-open specification DE 36 10 165 discloses an optical scanning microscope. This includes two beam deflection means for the two dimensional scanning of an object. The described microscope exhibits a high resolving power, which is not, however, combined with a large image field with, at the same time, a high scan rate for the scanning of the surface.

SUMMARY OF THE INVENTION

An object of the invention is the construction of a scanning objective, by means of which at high resolution, corresponding to a high numerical aperture, a large image field is scanned with at the same time a high scanning rate.

According to the invention, a scanning objective is provided which is positioned downstream of a beam deflection unit for guidance of an illumination beam or an illumination beam and a measurement beam. The scanning objective is especially useful for a scanning system for surface inspection of electronic circuit board assemblies. Three lens groups are provided. The first lens group is provided for coupling to the beam deflection unit. It has a positive refractive power and generates an intermediate image with a numerical aperture which is small in relation to an entire scanning objective, and has at the same time a large scan angle. The third lens group is provided on an object side and has a numerical aperture which is larger relative to the numerical aperture of the first lens group. The second lens group is interposed between the first and third lens groups and has a positive refractive power and a focal length which is greater than a focal length of the first lens group. The second lens group images an intermediate image generated by the first lens group at infinity. An exit pupil of the first and second lens groups is positioned ahead of the third lens group. At a location of an entrance pupil of the third lens group, a scan angle reduction is achieved by the first and second lens groups so that the third lens group similar to a collimator optical system can be corrected in a simple manner with respect to geometric imaging defects, with the exception of spherical aberation.

In principle, a high resolution of an objective is assured by a high value of the numerical aperture. The scan angle or respectively deflection angle determines the size of the image field, in conjunction with the focal length of the objective.

The invention is based on the finding that by means of a scanning objective comprising three lens groups, with appropriate design, the required quality features are achieved. A first lens group, seen in the direction of the scan beam, having positive refractive power and having a relatively small numerical aperture, can be considered, in the case of high imaging performance, as an ideal element for coupling to the beam deflection unit. This optical system corresponds in its construction to a typical scanning objective from the prior art, with a relatively large numerical aperture. It can be manufactured in diffraction-limited fashion using fewer than 6 individual lenses. A real intermediate image is generated by this lens group. Of great advantage is the sufficient zenith distance between the entrance pupil and the surface of the first lens.

A third lens group, which is disposed on the object side, has a high numerical aperture with large focal length and with a relatively small deflection angle of approximately 2.5°. In order to remain within the diffraction limitation, it must be ensured that geometric imaging defects are optimally corrected. If required, a reduction of the deflection angle has to be tolerated. As a result of the similarity of the construction to a collimator optical system, essentially only the correction of spherical aberration still needs to be undertaken. As a result of the described design of the third lens group, the imaging performance of a scanning system or of a scanning objective on the object side with a high numerical aperture is possible.

A second lens groups having positive refractive power, which images the real intermediate image of the first lens group at infinity, must be constructed so that the exit pupil, formed by the first and second lens groups, coincides with the entrance pupil of the third lens group. The image angle of the second lens group must in this case be in accordance with the deflection angle of the third lens group. This second lens group can, for example, be an inverted scanning objective. This means that a hitherto known scanning objective is used in the opposite direction. In this case, it is necessary to ensure the appropriate adaptation of the scan length (image height of the intermediate image) and the numerical aperture with respect to the first lens group. Furthermore, it is necessary to undertake an adaptation with respect to the scan angle (image angle) and the diameter of the entrance pupil of the third lens group. The ratio of the focal lengths of the first lens group to second lens group corresponds in this case to the ratio between scan angle (image angle) of the first lens group and the third lens group. All three lens groups are diffraction-limited.

A particularly advantageous refinement of the invention includes the design of the scanning objective as a F-θ objective. The necessary condition for an F-θ objective is the proportionality between the scan angle or deflection angle and the instantaneous out-deflection or the instantaneous image height. This has the effect of reducing the technical control expenditure in automatic testing systems.

It is advantageous to allow the principal rays to run parallel to the optical axis between the first and the second lens groups. This construction, corresponding to a telecentric design, can apply first to the first and second lens groups and on the other hand to the entire scanning objective. The advantages resulting therefrom reside in the fact that it is possible to connect individual telecentric lens groups one behind the other in a simple manner. The telecentric design of the entire scanning objective means, in particular, is an advantageous application for measurement purposes. Costly electronic (hardware or software) corrections are superfluous.

In the event that the total focal length of the scanning objective is smaller than the spacing between the first lens surface of the first lens group and the entrance pupil lying in front thereof, of the scanning objective, the coupling between the scanning objective and the beam deflection unit can be carried out in a simple manner.

If the numerical aperture of the first lens group is at least 0.15 (the numerical aperture of the entire scanning objective can be, for example, 0.6), then this is advantageous insofar as a greater freedom of design with regard to a high total numerical aperture is attainable for the construction of the lens groups which follow.

A further advantageous refinement of the invention provides that the scan angle has a value of approximately 16° and the entrance pupil possesses a diameter of approximately 7.5 mm. The specification of these two parameters of the scanning objective at the aforementioned numerical values gives particular advantages with respect to the design of a polygonal mirror rotating at a high speed of rotation (e.g. number of facets 12, mirror diameter approximately 70 mm, facet length approximately 19 mm).

If the numerical aperture of the third lens group is at least 0.25 in combination with a scan angle of approximately 2.5° and a scan length of approximately 8 mm, then it is already possible to set a working spacing between objective and object of approximately 30 mm.

In the text which follows, an embodiment is described with reference to diagrammatic figures.

BRIEF DESCRIPTION OF THE DRAWINGS

FIG. 3 shows the detailed structure of a scanning objective of high numerical aperture.

FIG. 4 chows the basic representation of the scanning objective according to FIG. 3.

DESCRIPTION OF THE PREFERRED EMBODIMENTS

Figure 1:
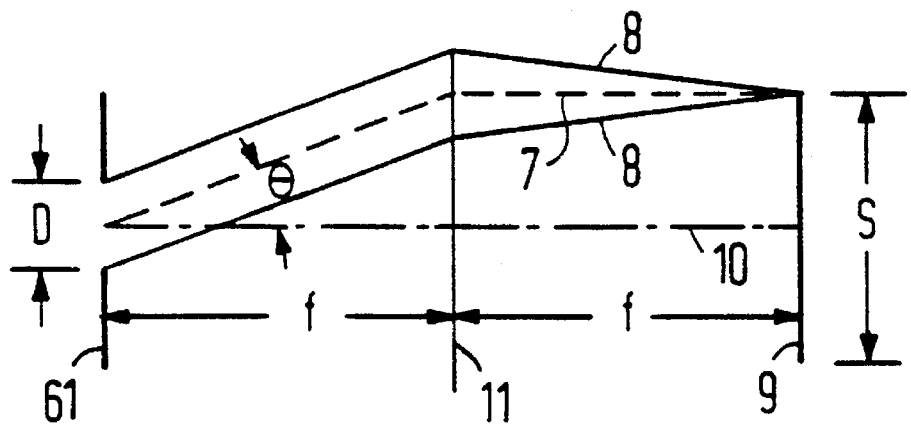
FIG. 1 shows a basic sketch of a typical scanning objective having a numerical aperture of 0.1.

The beam path of an objective 11 represented only by a line is outlined in FIG. 1. The objective 11 is positioned with respect to an optical axis 10. The focal length f is indicated on both sides of the objective 11. Proceeding from the beam diameter D at the entrance pupil 61, principal ray 7 and marginal rays 8 extend in accordance with the scan angle 8. The object plane 9 is indicated in the right hand part of the illustration. The scan length S corresponds to the image size.

Figure 2:
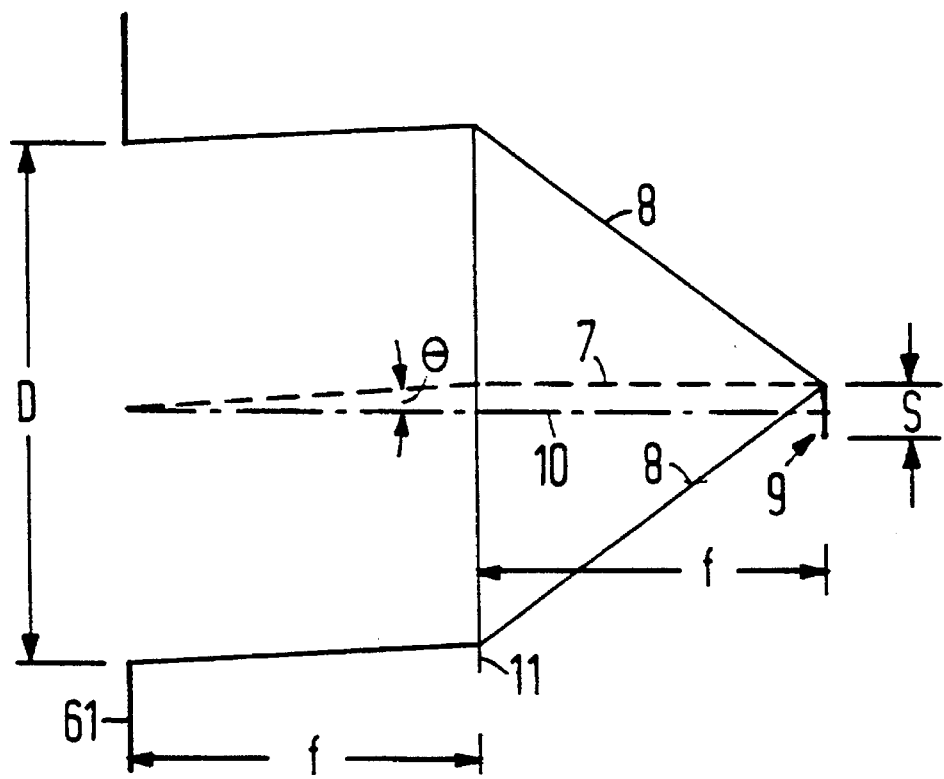
FIG. 2 shows the beam path of a scanning objective with an enlargement of the numerical aperture as compared with the representation in FIG. 1.

Known scanning objectives represented in FIG. 1 are distributed commercially by a plurality of manufacturers. As a rule, they exhibit a numerical aperture of <=0.1 and focal lengths of more than 20 mm. The scan angles lie in the range from +/−13° to 25°. As the Lagrange invariant represents a measure of the imaging performance of an optical component, the numerical aperture determines the size of the image point and the imaging performance is based on the number of resolved image points, the dimensioning should always be such that the desired aperture is present. If it is assumed that the Lagrange invariant remains constant as a measure of the imaging performance and the focal length of the entire system does not change, then upon increasing the numerical aperture the result is a beam path corresponding to FIG. 2. In this case also, the entrance pupil 61 and the object plane 9 lie in each instance at the focal point. The scan length S is outlined correspondingly symmetrically in relation to the optical axis 10 and the beam diameter D at the entrance pupil 61, which diameter is substantially greater than in FIG. 1, is shown. It is clearly evident that the scan angle θ has substantially decreased in relation to the scan angle θ of FIG. 1. The same applies to the scan length S. Principal ray 7 and marginal rays 8 have likewise been shown. A construction corresponding to FIG. 2 is, however, not practicable for the achievement of the set object, since in this case the accommodation of a beam deflection unit is, as a rule, possible only under poor conditions. The construction itself corresponds approximately to a collimator optical system, which as a rule images only one point. In this case, a high numerical aperture becomes attainable in a simple manner, since the image angle may be small.

If, based on the representation in FIG. 1, the Lagrange invariant and the scan angle θ are kept constant and the numerical aperture is increased, then the focal length f becomes smaller. This likewise presents difficulties in relation to the accommodation of a beam deflection unit ahead of the scanning objective.

The use of a pure microscope objective, for example 50×/0.6, is likewise possible only with difficulty for the achievement of the set object, since in this case an excessively small deflection angle is present. Beyond above this, again the entrance pupil is usually situated very close to the lens system of the microscope objective.

FIG. 3 shows a scanning objective with an upstream beam deflection unit 4. The scanning objective, which is built up from the described lens groups 1 to 3, possesses a numerical aperture of 0.6. The first lens group 1 and the second lens group 2 comprise in each instance 5 individual lenses. The first lens group possesses a numerical aperture of 0.15 and a focal length of 25 mm. The second lens group collimates the beams emanating from the real intermediate image 5 at a focal length of 160 mm. In this case, a beam expansion and an angle reduction take place. The third lens group 3, which comprises a doublet, three directly adjoining, positively refracting individual lenses and a lens triplet, possesses a focal length of 40 mm and a numerical aperture of 0.6. The overall length of the objective is approximately 650 mm.

A scanning objective according to FIG. 3 possesses a high numerical aperture (0.6 and a large scan length S). The first lens group i having an even smaller numerical aperture of 0.15 exhibits a large scan angle of approximately +/−16°. The first lens group 1 represents the coupling element to the beam deflection unit 4. The high numerical aperture of 0.6 of the third lens group 3 having a positive refractive power is attained by a small image angle of 2.5°. This means, for example, for the third lens group 3, a pupil diameter of 48 mm, a focal length f of 40 mm and an image field of 3.5 mm. In this case, with respect to its construction, this lens group is similar to a larger-scale microscope objective having a 50-fold magnification.

In principle, the first two lens groups 1, 2 thus effect a reduction of scan angle and a pupil enlargement (seen from left to right in the figure). In this case, the entrance pupil 61 of the first lens group 1 is imaged into the entrance pupil 63 of the third lens group 3, or, respectively, the exit pupil 62 of the first and second lens group 1, 2 coincides with the entrance pupil 63 of the third lens group 3. This gives the advantage that the spacing between entrance pupil 63 and the glass surface of the first lens of the third lens group 3 is released as an additional degree of freedom in the construction and for the optimization of the third lens group 3. The consideration of pupils of individual lens groups is applied only for the construction of a scanning objective. Such a scanning objective has, overall, only one entrance pupil and one exit pupil. An additional telecentric construction of the scanning objective simplifies the measured data evaluation of an automatic 3D inspection system.

Corresponding to FIG. 3 or 4, the intermediate image 5 is generated by the lens group 1. The path of the principal ray 7 and of the marginal rays 8 with respect to the lens groups 1–3 and with respect to the optical axis 10 is indicated. The second lens group 2 images the intermediate image 5 at infinity. In this case, a pupil imaging takes place by the first and second lens groups 1, 2, in which case the entrance pupil 61 of the first lens group 1 is imaged into the entrance pupil 63 of the third lens group 3. This can also be designated as scan angle transformation. The entrance pupil 63 of the third lens group 3 lies between the second and third lens groups 2, 3. Parallel rays are conducted through the pupil at maximum diameter. The first lens group 1, considered as such, can be considered as a scanning objective of low resolution. The same applies to the second lens group 2; in this case, however, this exhibits a greater focal length f.

Using a described scanning objective, for example, resolution can take place within the range of 0.5 μm.

FIG. 4 shows a basic representation of a scanning objective having a high numerical aperture.

Possible Technical Data

EXAMPLE 1

Numerical aperture (overall): 0.6
Focal length f: 6.25 mm
Beam diameter D, at the entrance: 7.5 mm
Working spacing: 5 mm
Scan angle θ: +/−16°
Spacing a: 15 mm
Scan length S: 3.5 mm

EXAMPLE 2

Beam diameter and scan angle are constant
Numerical aperture: 0.28
Scan length S: 7.5 mm
Working spacing: 27 mm
Focal length f: approx. 14 mm The basic construction of a scanning objective according to the invention includes, corresponding to the diagrammatic representation in FIG. 4, a first, second and third lens group 1, 2, 3. The surface of the object to be tested or the object plane 9 is outlined at the right hand margin of the illustration. The entrance pupil 61 of the entire scanning objective is represented at the left hand margin of the illustration. The entire arrangement exhibits an optical axis 10. The characteristic course of the principal ray 7 and of the marginal rays 8 is correspondingly outlined.

The entrance pupil 61, represented in FIG. 4 as a diaphragm, can be replaced by a rotating polygonal mirror. The exit pupil 62 of the first and second lens groups 1, 2 coincides with the entrance pupil 63 of the third lens group 3; in this case, the second lens group 2 images the intermediate image 5, generated by the first lens group 1, at infinity.

Although various minor changes and modifications might be proposed by those skilled in the art, it will be understood that I wish to include within the scope of the patent warranted hereon all such changes and modifications as reasonably come within my contribution to the art.

I claim:

1. A scanning objective for being positioned downstream of a beam deflection unit for guidance of an illumination beam for a scanning system, comprising:

first, second, and third lens groups:

the first lens group being positioned for coupling to said beam deflection unit and having a positive refractive power for generating an intermediate image with a numerical aperture which is smaller in relation to the entire scanning objective and at the same time having a large scan angle;

the third lens group being positioned at an object side and having a numerical aperture which is larger than said numerical aperture of said first lens group;

said second lens group being interposed between the first and third lens groups and having a positive refractive power and a focal length which is greater than a focal length of said first lens group and which images said intermediate image generated by the first lens group at infinity;

an exit pupil formed by the first and second lens groups being positioned ahead of said third lens group;

said first and second lens groups providing a scan angle reduction at a location of an entrance pupil of said third lens group compared to said large scan angle in front of said first lens group so that the third lens group, which is similar to a collimator optical system, can be corrected in a simple manner with respect to geometric imaging defects, except for spherical aberration; and the scanning objective being an F-θ objective.

2. A scanning objective for being positioned downstream of a beam deflection unit for guidance of an illumination beam for a scanning system, comprising:

first, second, and third lens groups;

the first lens group being positioned for coupling to said beam deflection unit and having a positive refractive power for generating an intermediate image with a numerical aperture which is smaller in relation to the entire scanning objective and at the same time having a large scan angle;

the third lens group being positioned at an object side and having a numerical aperture which is larger than said numerical aperture of said first lens group;

said second lens group being interposed between the first and third lens groups and having a positive refractive power and a focal length which is greater than a focal length of said first lens group and which images said intermediate image generated by the first lens group at infinity;

an exit pupil formed by the first and second lens groups being positioned ahead of said third lens group;

said first and second lens groups providing a scan angle reduction at a location of an entrance pupil of said third lens group compared to said large scan angle in front of said first lens group so that the third lens group, which is similar to a collimator optical system, can be corrected in a simple manner with respect to geometric imaging defects, except for spherical aberration; and said first lens group having a first lens surface and wherein a spacing between a zenith of said first lens surface and an entrance pupil lying in front of said scanning objective is greater than a total focal length of the scanning objective.

3. A scanning objective for being positioned downstream of a beam deflection unit for guidance of an illumination beam for a scanning system, comprising:

first, second, and third lens groups;

the first lens group being positioned for coupling to said beam deflection unit and having a positive refractive power for generating an intermediate image with a numerical aperture which is smaller in relation to the entire scanning objective and at the same time having a large scan angle;

the third lens group being positioned at an object side and having a numerical aperture which is larger than said numerical aperture of said first lens group;

said second lens group being interposed between the first and third lens groups and having a positive refractive power and a focal length which is greater than a focal length of said first lens group and which images said intermediate image generated by the first lens group at infinity;

an exit pupil formed by the first and second lens groups being positioned ahead of said third lens group;

said first and second lens groups providing a scan angle reduction at a location of an entrance pupil of said third lens group Compared to said large scan angle in front of said first lens group so that the third lens group, which is similar to a collimator optical system, can be corrected in a simple manner with respect to geometric imaging defects, except for spherical aberration; and said numerical aperture of said first lens group being at least 0.15.

4. A scanning objective for being positioned downstream of a beam deflection unit for guidance of an illumination beam for a scanning system, comprising:

first, second, and third lens groups;

the first lens group being positioned for coupling to said beam deflection unit and having a positive refractive power for generating an intermediate image with a numerical aperture which is smaller in relation to the entire scanning objective and at the same time having a large scan angle;

the third lens group being positioned at an object side and having a numerical aperture which is larger than said numerical aperture of said first lens group:

said second lens group being interposed between the first and third lens groups and having a positive refractive power and a focal length which is greater than a focal length of said first lens group and, which images said intermediate image generated by the first lens group at infinity;

an exit pupil formed by the first and second lens groups being positioned ahead of said third lens group;

said first and second lens groups providing a scan angle reduction at a location of an entrance pupil of said third lens group compared to said large scan angle in front of said first lens group so that the third lens group, which is similar to a collimator optical system, can be corrected in a simple manner with respect to geometric imaging defects, except for spherical aberration; and said scan angle having a value of approximately 16° and a beam diameter at an entrance pupil in from of the scanning objective being approximately 7.5 mm.

* * * * *